(12) United States Patent
Keil

(10) Patent No.: US 10,823,320 B1
(45) Date of Patent: Nov. 3, 2020

(54) PIPE JOINT

(71) Applicant: Northwest Pipe Company, Vancouver, WA (US)

(72) Inventor: Brent Keil, Vancouver, WA (US)

(73) Assignee: Northwest Pipe Company, Vancouver, WA (US)

( * ) Notice: Subject to any disclaimer, the term of this patent is extended or adjusted under 35 U.S.C. 154(b) by 401 days.

(21) Appl. No.: 15/891,816

(22) Filed: Feb. 8, 2018

Related U.S. Application Data

(60) Provisional application No. 62/457,760, filed on Feb. 10, 2017.

(51) Int. Cl.

| | | |
|---|---|---|
| *F16L 37/084* | (2006.01) | |
| *F16L 1/036* | (2006.01) | |
| *E21B 17/046* | (2006.01) | |
| *E21B 7/20* | (2006.01) | |
| *E21B 7/04* | (2006.01) | |

(52) U.S. Cl.
CPC .......... *F16L 37/084* (2013.01); *E21B 17/046* (2013.01); *F16L 1/036* (2013.01); *E21B 7/046* (2013.01); *E21B 7/20* (2013.01)

(58) Field of Classification Search
CPC ....... E21B 17/046; F16L 37/084; F16L 37/08; F16L 1/036; F16L 47/06; F16L 47/12
USPC ........................................................ 285/330
See application file for complete search history.

(56) References Cited

U.S. PATENT DOCUMENTS

| | | | |
|---|---|---|---|
| 4,124,232 A * | 11/1978 | Ahlstone ................. | E02D 5/523 285/18 |
| 4,298,221 A * | 11/1981 | McGugan ............... | B23P 11/02 285/328 |
| 4,525,001 A | 6/1985 | Lumsden et al. | |
| 4,629,221 A | 12/1986 | Lumsden et al. | |
| 4,958,959 A * | 9/1990 | St. Onge ................. | F16L 1/036 138/97 |
| 5,015,014 A * | 5/1991 | Sweeney ................. | F16L 47/12 285/328 |
| 5,078,430 A * | 1/1992 | St. Onge ................. | F16L 1/036 285/15 |
| 5,360,242 A * | 11/1994 | Argent ................ | E21B 17/0426 228/189 |
| 5,738,388 A * | 4/1998 | Sundelin ................. | E21B 17/00 285/382 |
| 5,921,591 A | 7/1999 | Argent | |
| 7,648,176 B2 | 1/2010 | Van Bilderbeek | |
| 2017/0321834 A1 * | 11/2017 | Keil ...................... | F16L 37/084 |

* cited by examiner

Primary Examiner — David Bochna
(74) Attorney, Agent, or Firm — Klarquist Sparkman, LLP

(57) ABSTRACT

A pipe joint has male and female couplers with interfitting features that join pipe sections together when the male coupler is positioned within the female coupler. The couplers can be separate rings or formed in the ends of lengths of pipe. Typically, a male coupler is at one end of a length of pipe and a female coupler is at the opposite end of the pipe. The interfitting features can include three or more ridges or teeth of a first coupler (a male coupler) and the same number of ridges or teeth of a second coupler (a female coupler) each tooth being positioned in a respective transition region of the coupler. Ramp surfaces of the couplers are positioned at opposite sides of each tooth. The ramp surfaces have respective slopes, and the interfitting features are designed to reduce the forces required to push the couplers together into a locked engagement.

32 Claims, 8 Drawing Sheets

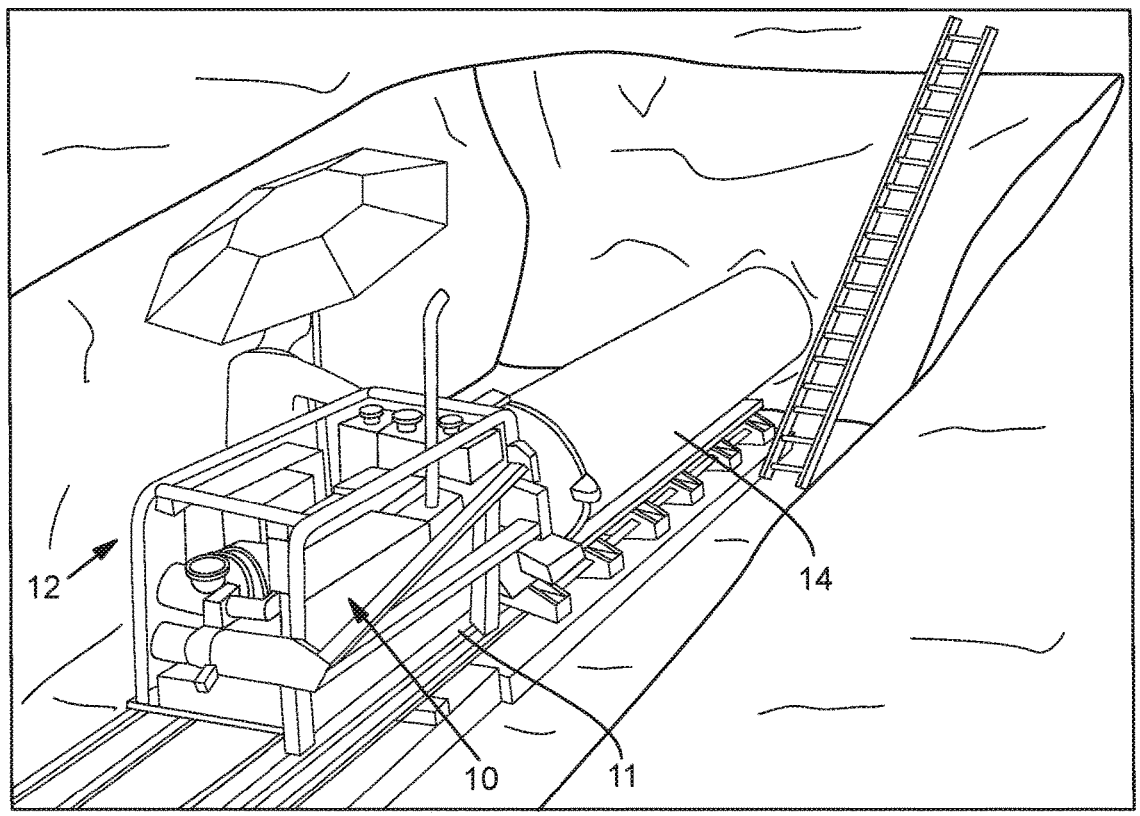
PRIOR ART FIG. 1
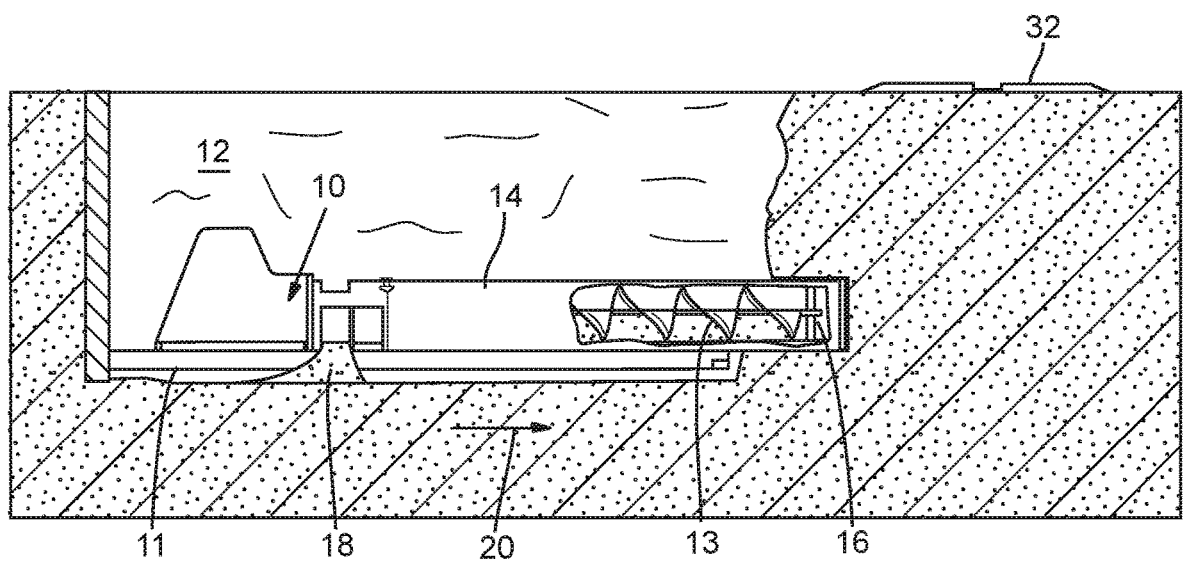
PRIOR ART FIG. 2

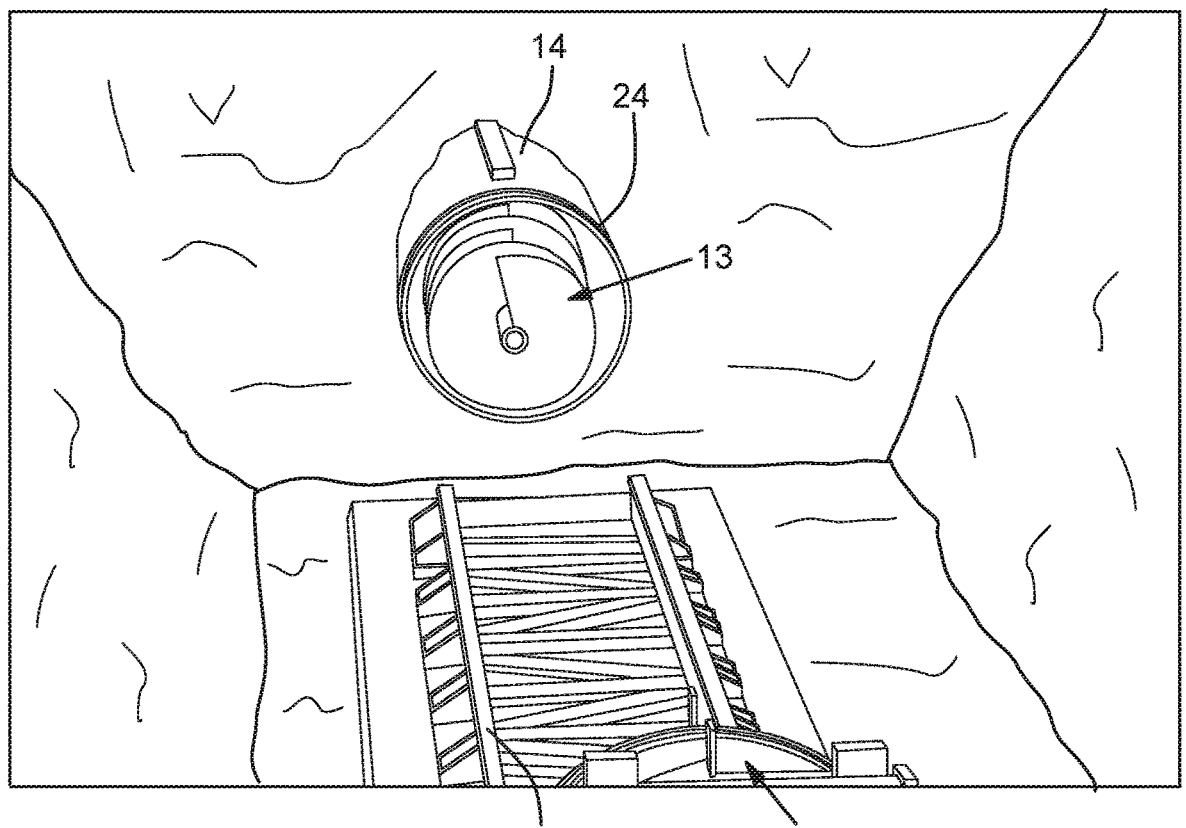
PRIOR ART  FIG. 3
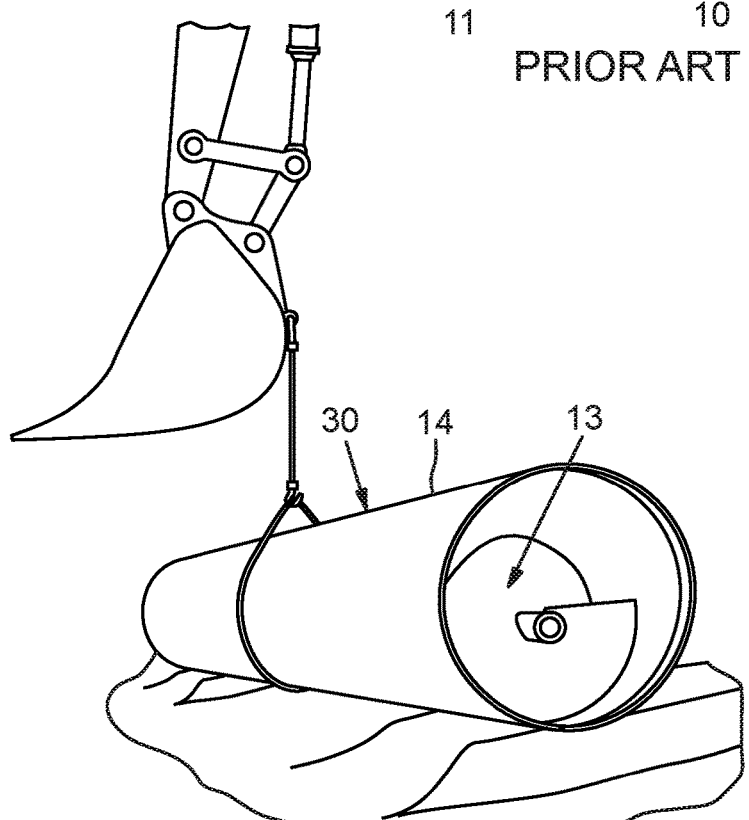
PRIOR ART  FIG. 4

ID RING SECTION (NTS)
DEPTH OF TRANSITION EXAGGERATED

PIPE JOINT

CROSS REFERENCE TO RELATED APPLICATION

This application claims the benefit of U.S. Provisional Application Ser. No. 62/457,760, entitled PIPE JOINT, filed on Feb. 10, 2017, which is incorporated by reference herein.

FIELD

This disclosure relates to pipe joints that are press fit together and to pipe assemblies utilizing such joints. The pipe joints are particularly useful in auger boring operations.

BACKGROUND

Conventional auger boring can be used to install steel casing pipe in relatively soft stable ground conditions such as clay or soils. The bored soil is transported back through the casing. This minimizes the possibility of ground settlement from excavation. As a result, auger boring is a desired approach for installing pipes, utilities and the like in locations where some settlement is a concern, such as under roads, train rails and levies.

With reference to FIGS. 1-4, in auger boring, an auger boring machine 10 is positioned on a track 11 in a pit 12. The auger boring machine rotates an auger chain or flight 13 positioned within a casing pipe 14 and fitted to a cutter head 16 at the front of the casing.

The rotating cutter head 16 cuts through the soil in front of the leading end of the casing. The soil is transported back to the machine by a helical auger chain 13 and removed (see soil 18 in FIG. 2). The auger boring machine 10 advances along the track 11, which is aligned to drive the casing pipe 14 on a desired installation line. As the auger boring machine 10 moves along the track 11 in a first direction 20, it pushes the casing 14 and advances it into the bore hole created by the cutting head 16. When the auger boring machine 10 approaches or reaches the end of the track, the auger chain 13 is disconnected (but left in the casing). The boring machine is moved in a second direction opposite to the first direction 20 along the track to its starting position. This leaves an end of the casing exposed. FIG. 3 shows the exposed end of the casing pipe 14 following the return of the boring machine 10 to a starting position that is spaced far enough from the exposed pipe end to permit another casing pipe segment to be positioned between the boring machine and the exposed end 14.

A next casing segment or section 30, with an auger flight 13 therein (see FIG. 4) is positioned in the pit and the leading end thereof is welded to the exposed end 24 of the casing pipe. The auger chain 13 in the newly attached casing section is connected to the boring machine and also to the auger chain in the casing with the exposed end and thereby to the cutter head 16. The excavation and thrust process is repeated with additional casing segments until the casing has been advanced as far as desired (e.g., to extend completely under a road 32). The auger chain is then withdrawn from the installed casing pipe and the casing pipe is cleaned of all remaining soil.

The process of positioning and welding casing pipe sections together is relatively time consuming and slows down the boring process. Also, it can be difficult to achieve suitable welds in the confines of a pit. Moreover, auger boring machines, unlike pipe ramming machines, are much more limited in the amount of axial pushing force they can exert on the end of a casing pipe section.

Therefore, a need exists for a pipe joint that can be installed, such as to accomplish auger boring, without the requirement of welding the ends of pipe sections together and without requiring excessive axial forces to accomplish the pipe joint.

SUMMARY

A pipe joint comprises male and female couplers with interfitting features that join pipe sections together when the female coupler is positioned within the male coupler. The couplers can be separate rings or be formed in the ends of respect lengths of pipe. Typically, a male coupler is at one end of a length of pipe and a female coupler is at the opposite end of the pipe.

The interfitting features can comprise three or more ridges or teeth of a first coupler (a male coupler) and the same number of ridges or teeth of a second coupler (a female coupler) each tooth being positioned in a respective transition region of the coupler. Ramp surfaces of the couplers are desirably positioned at opposite sides of each tooth. The ramp surfaces have respective slopes that are selected to reduce the forces required to push the couplers together into a locked engagement with the male coupler within the female coupler. Desirably, the ramp surface slopes are all less than 0.1.

As an aspect of embodiments, the first coupler comprises a first coupler first ramp nearest to the distal end of the first coupler and a first coupler second ramp spaced from the distal end of the first coupler and at least two first coupler intermediate ramps between the first coupler first and second ramps. The first coupler first ramp having a first coupler first ramp surface with a first coupler first ramp surface slope and the first coupler second ramp having a first coupler second ramp surface with a slope. In accordance with this aspect, the slope of the first coupler first ramp surface can be or is greater than slope of the first coupler second ramp surface. For example, the first coupler second ramp surface slope can be approximately one-third the first coupler first ramp surface slope. In addition, or alternatively, the second coupler comprises a second coupler first ramp nearest to the distal end of the second coupler and a second coupler second ramp spaced from the distal end of the second coupler and at least two second coupler intermediate ramps between the second coupler first and second ramps. The second coupler first ramp having a second coupler first ramp surface with a second coupler first ramp surface slope and the second coupler second ramp having a second coupler second ramp surface with a slope. In accordance with this aspect, the slope of the second coupler first ramp surface can be or is less than slope of the second coupler second ramp surface.

As an additional aspect of embodiments, the second coupler second ramp surface slope can be less than the first coupler first ramp surface slope. For example, the second coupler second ramp surface slope can be approximately twenty percent less than the first coupler first ramp surface slope.

As a more specific example, the first coupler first ramp surface slope and the first coupler intermediate ramp surface slopes can be from 0.05 to 0.08, the first coupler second ramp surface slope can from 0.01 to 0.04; the second coupler first ramp surface slope can be from 0.01 to 0.04 and the second coupler second ramp surface slope and the second coupler intermediate ramp surface slopes can be from 0.05 to 0.08.

As yet another aspect of embodiments, the second coupler intermediate ramp surface slopes can be the same or approximately the same for each second coupler intermediate ramp surfaces and less than the second coupler second ramp surface slope, and wherein the second coupler second ramp surface slope and second coupler intermediate ramp surface slopes can be greater than the second coupler first ramp surface slope.

As still further aspects of embodiments, the first coupler intermediate ramp surface slope can be the same or approximately the same for each first coupler intermediate ramp and greater than the first coupler first ramp surface slope and greater than the first coupler second ramp surface slope, and wherein the first coupler second ramp surface slope can be less than the first coupler second ramp surface slope.

As yet another aspect of embodiments, the tooth depth of each tooth or ridge can be equal to the height of the tooth surface in the radial direction and can range from approximately 0.03 to 0.04 inches.

As a further aspect of embodiments, the tooth depth of each tooth can be equal to the height of the tooth surface in the radial direction and can be determined by the formula: Tooth or transition depth is equal to or approximately equal to: [[(pipe diameter/24)*0.005]+0.025], wherein * indicates multiplication and the pipe diameter is in inches.

As another aspect of embodiments, a respective first coupler first annular surface of a constant diameter and coaxial with the first longitudinal axis is positioned at the side of each tooth of the first coupler nearest to the first distal end and a respective first coupler second annular surface of a constant diameter and coaxial with the first longitudinal axis is positioned at the side of each tooth of the first coupler nearest to the first shelf; wherein a respective second coupler first annular surface of a constant diameter and coaxial with the second longitudinal axis is positioned at the side of each tooth of the second coupler nearest to the second distal end and a respective second coupler second annular surface of a constant diameter and coaxial with the second longitudinal axis is positioned at the side of each tooth of the second coupler nearest to the second shelf, wherein the widths of the first coupler first annular surfaces in the longitudinal direction are less than the widths of the first coupler second annular surfaces in the longitudinal direction; and wherein the widths of the second coupler first annular surfaces in the longitudinal direction are less than the widths of the second coupler second annular surfaces in the longitudinal direction.

As a further aspect of embodiments, each of the first coupler first ramp, first coupler second ramp, first coupler intermediate ramps, second coupler first ramp, second coupler second ramp, and second coupler intermediate ramp can each have the same length in the longitudinal direction and wherein the first coupler first annular surfaces and second coupler first annular surfaces can have a length in the longitudinal direction that is approximately five to ten present of the length of the ramp sections.

As another aspect of embodiments, the first coupler desirably comprises a first coupler base section extending from the first shelf to the first coupler second ramp section and has a first coupler base section axial length, the first coupler also comprising a first coupler entrance section extending from the first distal end to the first coupler first ramp section and having a first coupler entrance section axial length, the first coupler base section having an axial length that is longer than the axial length of the first coupler entrance section. In addition, the second coupler desirably comprises a second coupler base section extending from the second shelf to the second coupler second ramp section and has a second coupler base section axial length, the second coupler also comprising a second coupler entrance section extending from the second distal end to the second coupler first ramp section and having a second coupler entrance section axial length, the second coupler base section having an axial length that is longer than the axial length of the second coupler entrance section. In addition, the first coupler base section axial length can be the same as the second coupler base section axial length and the first coupler entrance section axial length can be the same as the second coupler entrance section axial length.

In accordance with an additional aspect, the diameter of the second coupler at the location of the second coupler first tooth at the second coupler first transition region is less than or equal to the diameter of the first coupler first tooth at the location of the first coupler first transition region. With this construction, when axially aligned, the second coupler can be inserted deeply into the first coupler and beyond the first coupler first tooth with a reduced insertion force. This also allows the joints to be coupled together while axially aligned and without the need, or while minimizing any need, to tilt the pipe being inserted.

As a further aspect in combination with one or more of the above aspects, the first and second pipes have respective first and second ends, and the first coupler can comprise a first ring adapted to be mounted to a first end of the first pipe and the second coupler can comprise a second ring adapted to be mounted to the second end of the second pipe. Alternatively, the features of the first and second couplers can be formed in the ends of lengths of pipe. For example, a first coupler can be formed in or mounted to the first end of a first pipe and a second coupler can being formed in or mounted to the second end of the first pipe. A plurality of such pipes can then be joined together by their respective first and second couplers.

The foregoing and other features, and advantages of the invention will become more apparent from the following detailed description, which proceeds with reference to the accompanying figures. The invention disclosed herein encompasses all of the aspects of interfitting joint features disclosed herein individually, as well as all combinations and sub-combinations thereof, and is not limited to all of such aspects in combination with one another or to specific combinations of the aspects.

BRIEF DESCRIPTION OF THE DRAWINGS

FIG. 1 is a view of an auger boring machine shown pushing a pipe casing through a hole being drilled by an auger cutting head rotated by the boring machine.

FIG. 2 is a schematic side elevational view of an auger boring machine shown in operation boring a hole and advancing a pipe underneath a roadway.

FIG. 3 is a view of the auger boring machine moved to a position away from an exposed end of a pipe that has been advanced and positioned into the ground by the boring machine. FIG. 3 also shows an auger flight visible at the exposed end of the pipe for joining to an auger flight in the next section of pipe to be included in the pipe casing.

FIG. 4 illustrates a pipe segment with an auger flight shown therein, the pipe segment being ready for lifting into position for welding to the exposed end of a preceding pipe segment for subsequent advancing by the auger boring machine underneath the roadway.

DETAILED DESCRIPTION

Throughout this disclosure, when a reference is made to a first element being coupled to a second element, the term "coupled" is to be construed to mean both direct connection of the elements as well as indirect connection of the elements by way of one or more additional intervening elements. Also, the singular terms "a", "and", and "first", mean both the singular and the plural unless the term is qualified to expressly indicate that it only refers to a singular element, such as by using the phase "only one". Thus, for example, if two of a particular element are present, there is also "a" or "an" of such element that is present. In addition, the term "and/or" when used in this document is to be construed to include the conjunctive "and", the disjunctive "or", and both "and" and "or". Also, the terms "includes" and "has" have the same meaning as "comprises". Also, the terms "including" and "having" have the same meaning as "comprising".

Figure 5:
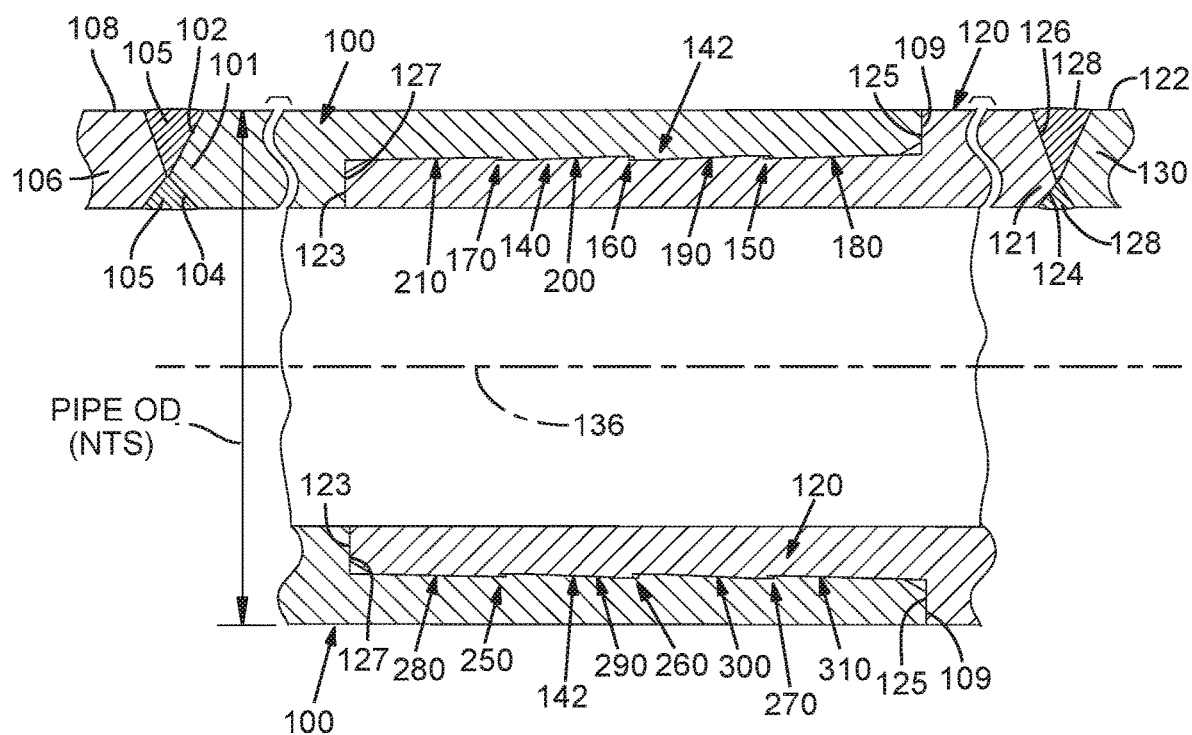
FIG. 5 is a sectional view through first and second pipes joined together by a press fit pipe joint in accordance with an embodiment of this disclosure, the joint comprising an OD ring coupled to the first pipe and an ID ring coupled to the second pipe, the respective rings having interfitting pipe joining features. The press fit pipe joint is particularly adapted for joining pipe sections together in an auger boring operation.

Referring to FIG. 5, an exemplary embodiment of two pipes with respective interfitting pipe joint sections or components are shown. A first ring 100, indicated as the outer or OD ring, is desirably annular and is desirably circular in cross-section. A first or proximal end 101 (proximal because it is proximal to one end of a length of pipe 108 to which it is attached) of ring 100 desirably has converging weld surfaces 102, 104 for use in welding end 101, for example butt welding by welds 105, to the end 106 of a pipe section 108 to thereby attach ring 100 to the pipe section 108. The OD ring 100 also has a distal end 109. In FIG. 5, NTS is an abbreviation for "not to scale". As can be seen in FIG. 5, desirably the outer diameter (pipe OD) of the ring 100 is the same as the OD of the pipe section 108.

A second ring 120, indicated as the inner or ID ring in FIG. 5 is also desirably annular and desirably circular in cross-section. A first or proximal end 121 (proximal because it is proximal to one end of a length of pipe 122 to which it is attached) of ring 120 desirably has converging weld surfaces 124, 126 for use in welding end 121, for example butt welding by welds 128, to an end 130 of pipe section 122 to thereby attach ring 120 to the pipe section 122. The ID ring 120 has a distal end 123.

The distal end 109 of the OD ring 100 bounds an opening, desirably circular in cross section that is sized to receive the ID ring 120. When fully engaged, the distal end 109 of OD ring 100 abuts an annular shelf 125 of ID ring 120 and the distal end 123 of the ID ring 120 abuts an annular shelf 127 of OD ring 100. The shelf 127 can, for example, be planar and perpendicular to the axis 136. The OD ring shelf 127 may also be angled toward distal end 109 moving outwardly from the base of the shelf toward the axis 136, with for example, the distal end 123 of the ID ring having the same angle. Other configurations of the shelf 127 may be used with the shelf functioning as a stop which abuts the distal end of 123 of ID ring 120 to limit the depth of insertion of the ID ring into the OD ring. The ID ring shelf 125 can, for example, be planar and perpendicular to the axis 136. The shelf 125 may also be angled toward distal end 123 moving outwardly from the base of the shelf and away from axis 136. Other configurations of the shelf 125 may be used with the shelf functioning as a stop which abuts the distal end of 109 of OD ring 100 to limit the depth of insertion of the OD ring into the ID ring, with, for example, the distal end 109 of the OD ring having the same angle.

The OD ring 100 has interfitting pipe joining features 140 on the inner surface thereof facing inwardly toward the longitudinal axis or centerline 136 of the pipe sections 108, 122, OD ring 100 and ID ring 120 when these components are axially aligned. The ID ring 120 has interfitting pipe joining features 142 on the outer surface thereof that face outwardly toward the longitudinal axis or centerline 136 of the pipe sections 108, 122, OD ring 100 and ID ring 120 when these components are axially aligned. The interfitting pipe joining features 140, 144 are described below.

In the description below, references to radial dimensions are to directions from the center line 136 of a pipe to which the rings 100, 102 or in which the joining features are formed if not provided as rings, and perpendicular to the center line. References to diameters are to the distance in a direction perpendicular to the centerline 136 and from a first surface of a first feature on the ring, across the centerline and to the corresponding or second feature on the ring of a second surface of the ring that is 180 degrees from first surface and first feature.

Rings 100, 120 are shown in FIG. 5 according to a first exemplary embodiment as separately machined rings configured to be welded to the respective ends of separate pipe sections. The inclusion of the pipe joining structural features in separate rings allows for more precise machining; in contrast to machining the pipe joining structural features into the respective ends of pipe sections. However, it is to be understood that the rings, 100, 120 can alternatively be machined or otherwise formed directly into the ends of pipe sections. Typically, each pipe section is provided at a construction site with a ring 100 welded to one end and a ring 120 welded to the opposite end. Typically, ring 120 (the male pipe joint section) will be at the trailing end of a string of pipe sections being advanced, as by auger boring, through the ground and ring 100 (the female pipe joint section that receives the male pipe joint section) will be at the leading end of the next pipe section to be joined together by press fitting in the pipe string. Silicon or other pipe sealing material can applied to one or both of the pipe fittings so that when they are joined together, a water tight seal is provided.

The interfitting surfaces or first coupler features 140 of the OD ring 100 have at least three transition regions, and desirably three or four transition regions, between the distal end 109 and shelf 127. Moving axially along the interior surface of the OD ring 100 in a direction from distal end 109 toward shelf 127, in the exemplary embodiment of FIG. 5, three transition regions 150, 160 and 170 are shown. In addition, a ramp region is provided on opposite sides of each transition region. In FIG. 5, there are four such ramp regions that are indicated by the numbers 180, 190, 200 and 210. Ramp region 180 extends from distal end 109 to the first transition region 150; ramp region 190 extends from transition region 150 to transition region 160; ramp region 200 extends from transition region 160 to transition region 170 and ramp region 210 extends from transition region 170 to the shelf 127. The OD ring transition regions and ramps will be described in greater detail below.

The interfitting surfaces or second coupler features 142 of the ID ring 120 desirably have the same number of transition regions as the number of transition regions in the interior surface of the OD ring. Therefore, the ID ring has at least three transition regions, and desirably three or four transition regions, between the distal end 123 and shelf 125. Moving axially along the interior surface of the ID ring 120 in a direction from distal end 123 toward shelf 125, in the exemplary embodiment of FIG. 5, three transition regions 250, 260 and 270 are shown. In addition, a ramp region is provided on opposite sides of each transition region. In FIG. 5, there are four such ramp regions that are indicated by the numbers 280, 290, 300 and 310. Ramp region 280 extends from distal end 123 to the first transition region 250; ramp region 290 extends from transition region 250 to transition region 160; ramp region 300 extends from transition region 260 to transition region 270 and ramp region 310 extends from transition region 270 to the shelf 125. The ID ring transition regions and ramps will be described in greater detail below.

Figure 6:
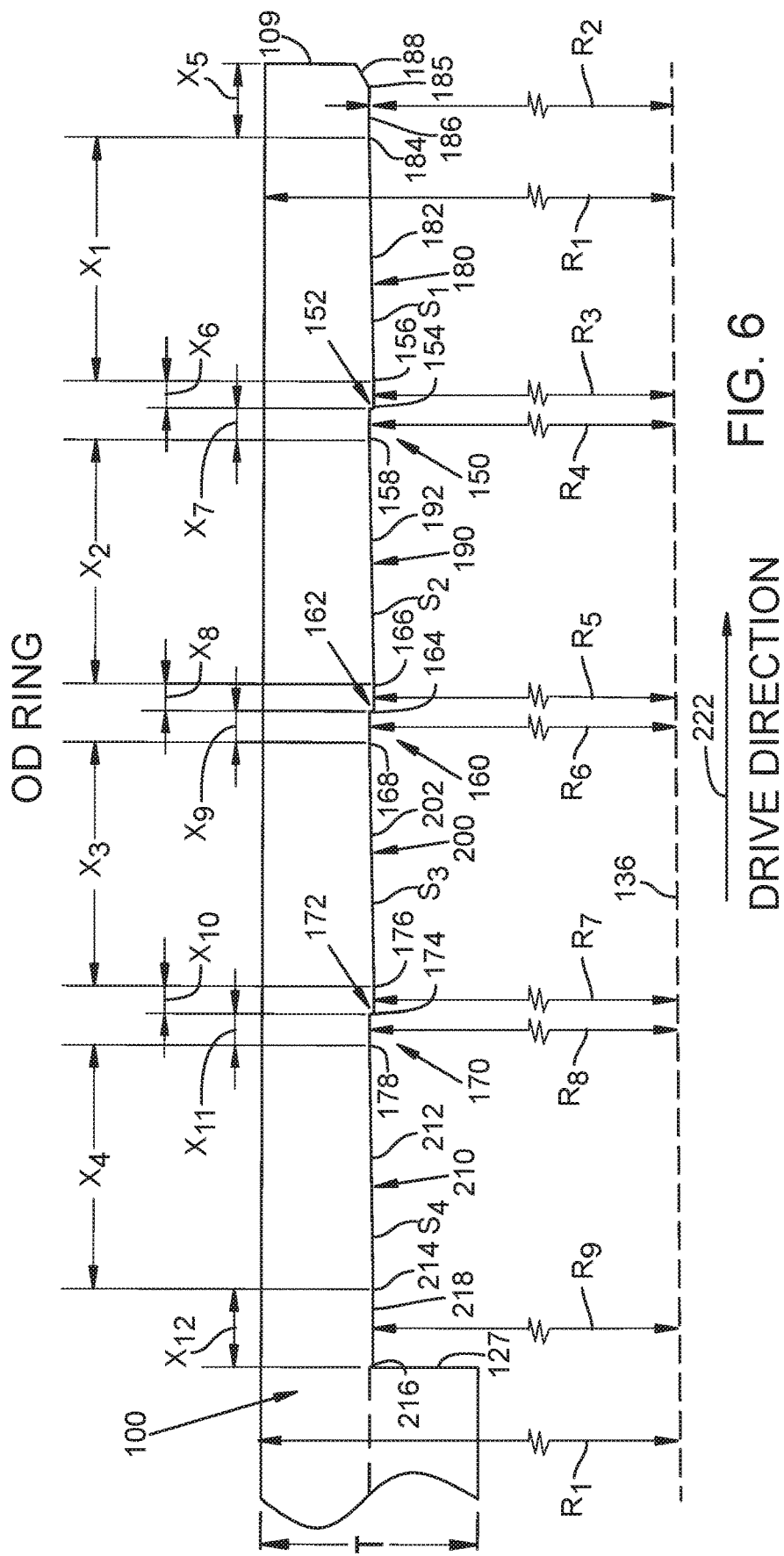
FIG. 6 is a sectional view through a portion of the OD ring containing the joint features.

FIG. 6 illustrates an example of the OD Ring 100 in greater detail. The designation R1 indicates the radius from the outer surface of the OD ring to the longitudinal axis 136. The respective radii R2-R8 represent the radii at various locations from the interior surface of the OD ring to the axis 136. The diameters at each location would be twice the radius. This drawing is not to scale.

The respective transition regions 150, 160, and 170 in FIG. 6 are each provided with an abrupt increase in radius moving across the transition region in a direction from the distal end 109 toward the shelf 127; which defines a ridge or tooth at the location of the increase in radius. In this description the term tooth includes a ridge and the term ridge includes a tooth. The teeth for the respective transition regions are indicated at 152 for region 150, 162 for region 160, and 172 for region 170. The location of each of the transitions is indicated at 154 for transition 150, at 164 for transition 160 and at 174 for transition 170. Each tooth desirably comprises a radially extending wall at the transition region that is perpendicular to axis 136, although the walls can be sloped, such as undercut to slope away from shelf 127 moving inwardly toward axis 136. Other shapes can also be used provided the teeth function to engage corresponding teeth of the ID ring to resist separation of pipe sections after press fitting the OD ring of one pipe section onto the ID ring of another pipe section by advancing the pipe section of OD ring 100 in the relative direction indicated by arrow 222 in FIG. 6 and designated as the drive direction. The teeth are desirably annular and desirably extend continuously around the inner surface of the OD ring.

With further reference to FIG. 6, to provide added tolerance at the location of each tooth, an annular flat or cylindrical surface or ridge or rings having the same radius as the tooth can be positioned at the leading side of each tooth. These ridges have inwardly facing surfaces that extend between locations 154 and 156, of radius R3, for transition region 150, between locations 164 and 166 of radius R5, for transition region 160 and between locations 174 and 176, of radius R7, for transition region 170. The radii R3 is greater than radius R5 and radius R5 is greater than radius R7. Hence these transition regions in effect step up moving in the direction from distal end 109 toward the shelf 127. The width (in the longitudinal direction of each of these ridges) is indicated as X6 for transition region 150, as X8 for transition region 160, and as X10 for transition region 170. These widths X6, X8 and X10, need not be the same, but in one desirable example they are the same. The widths X6, X8, and X10 can be, for example, approximately equal to five to ten percent of the width of the ramp section leading up to the ring (e.g. the width of the ridge between locations 154 and 156 can be approximately five to ten percent of the width of ramp section 180 between locations 184 and 156).

Continuing with reference to FIG. 6, to provide added tolerance to receive corresponding teeth of the ID ring when the joint is press fit together, at the location of each tooth, an annular flat or cylindrical surface or trough or base rings having the same radius as the base of the tooth can be positioned at the trailing edge of each tooth. These troughs can have inwardly facing surfaces that extend between locations 154 and 158, of radius R4, for transition region 150, between locations 164 and 168, of radius R6, for transition region 160 and between locations 174 and 178, of radius R8, for transition region 170. The width (in the longitudinal direction of each of these troughs) is indicated as X7 for transition region 150, as X9 for transition region 160, and as X11 for transition region 170. These widths X7, X9 and X11, need not be the same, but in one desirable example they are the same. The widths X7, X9 and X11 in one example are greater than the widths X6, X8 and X10. For example, the widths X7, X9 and X11 can be approximately ten to twenty percent greater than the widths X6, X8 and X10. For example the width of the trough between locations 154 and 158 can be approximately ten to twenty percent greater than the width of the ridge between locations 154 and 156.

The OD ring 100, as shown in FIG. 6 has an entrance section 186 adjacent the opening leading to the pipe that can have an inwardly facing cylindrical surface of a radius R2 that is greater than or equal to the radius of the adjoining ramp section 180 to facilitate receipt of the ID ring by the OD ring as the pipe section containing the OD ring is advanced in the drive direction 222. This section is shown extending axially from a location 184 to a location 185. An annular chamfer 188 can be provided adjacent to distal end 109 to further guide the ID ring as the pipe sections are press fit together. The OD ring 100 also has a base section 218 adjacent the shelf 127 extending from the base 216 of the shelf to a location 214 at the end of ramp section 210. The base section 218 is desirably longer in the axial direction than the length in the axial direction of the entrance section 186 [e.g. X12 is desirably greater than X5 in FIG. 6] to provide clearance to allow the teeth of the OD ring and ID ring (described below) to pass over one another and to be spaced apart from one another when the OD and ID rings are joined together. The illustrated base section can comprise a cylindrical surface of radius R9.

Exemplary ramp sections 180, 190, 200 and 210 of OD ring 100 are shown in FIG. 6. Ramp section 180 extends from location 184 to location 156, ramp section 190 extends from location 158 to location 166, ramp section 200 extends form location 168 to location 176, and ramp section 210 extends from location 178 to location 214. The ramp sections shown in FIG. 6 are annular and desirably extend continuously about the inner surface of the OD ring. Each of these ramps have a radius at its start location (respective start locations are 184, 158, 168 and 178) nearest to the distal end 109 that is greater than the radius at the end of the ramp section furthest from the distal end (respective end locations 156, 166, 176 and 214). Desirably, these ramps have radii that progressively increase moving in the distal end toward shelf end direction. These ramps can be frustoconical in shape.

Figure 7:
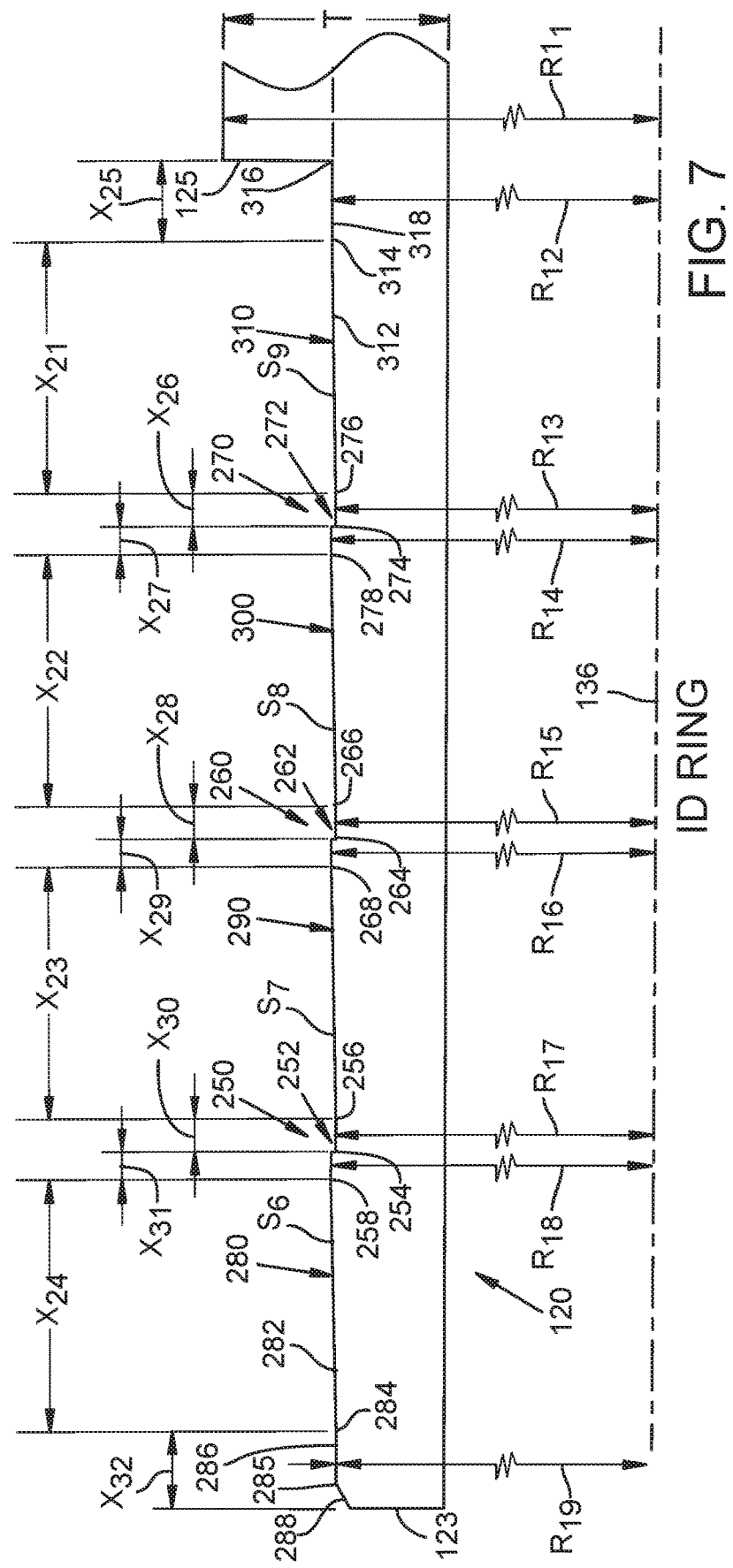
FIG. 7 is a sectional view through a portion of the ID ring containing the joint features.

The slopes of the ramps S1, S2, S3 and S4 for the respective ramp sections 180, 190, 200 and 200 can be the same. However, more desirably, the slopes of the first and last ramp sections (in this example S1 and S4) are less than the slopes of the middle ramp sections (in this example S2 and S3). In addition, the slope S4 of the last ramp section is desirably less than the slope S1. Also, the slopes S2 and S3 can be the same. The reduced slope S1 facilitates insertion of the ID Pipe further into the OD pipe before the ramp surfaces contact one another and thereby reduces the force required to push pipe ends together. The reduced slope of S4 also contributes to this reduction in joining forces. Although they can be varied, desirably, each of the slopes S1, S2, S3 and S4 are less than 0.1. More desirably, the slopes S1, S2 and S3 can be from 0.05 to 0.08 and the slope S4 can be from 0.01 to 0.04. As a specific example, the slope S4 can be approximately one third of the slope S1. FIG. 7 illustrates an example of the ID Ring 120 in greater detail. The designation R1 indicates the radius from the outer surface of the OD ring to the longitudinal axis 136 and desirably is the same as R1 in FIG. 7. The respective radii R12-R19 represent the radii at various locations from the exterior surface of the ID ring to the axis 136. The diameters at each location would be twice the radius. This drawing is not to scale.

The respective transition regions 250, 260, and 270 in FIG. 7 are each provided with an abrupt decrease in radius moving across the transition region in a direction from the distal end 123 toward the shelf 125; which defines a ridge or tooth at the location of the decrease in radius. The teeth for the respective transition regions are indicated at 252 for region 250, 262 for region 260, and 272 for region 270. The location of each of the transitions is indicated at 254 for transition 250, at 264 for transition 260 and at 274 for transition 270. Each tooth desirably comprises a radially extending wall at the transition region that is perpendicular to axis 136, although the walls can be sloped, such as undercut to slope toward distal end 123 from shelf 125 moving outwardly away from axis 136. Other shapes can also be used provided the teeth function to engage corresponding teeth of the OD ring to resist separation of pipe sections after press fitting the OD ring of one pipe section onto the ID ring of another pipe section by advancing the pipe section of OD ring 100 in the relative direction indicated by arrow 222 in FIG. 6 and designated as the drive direction in FIG. 6. The teeth are desirably annular and desirably extend continuously around the inner surface of the OD ring.

With further reference to FIG. 7, to provide added tolerance at the location of each tooth, an annular flat or cylindrical surface or trough or rings having the same radius as the tooth can be positioned at the lagging side of each tooth (the side closest to distal end 123). These troughs have inwardly facing surfaces that extend between locations 254 and 256, of radius R17, for transition region 250, between locations 264 and 266 of radius R15, for transition region 260, and between locations 274 and 276, of radius R13, for transition region 270. The radii R17 is less than radius R15 and radius R15 is less than radius R13. Hence these transition regions in effect step down moving in the direction from distal end 123 toward the shelf 125. The width (in the longitudinal direction of each of these troughs) is indicated as X30 for transition region 250, as X28 for transition region 260, and as X26 for transition region 270. These widths X30, X28 and X26, need not be the same, but in one desirable example they are the same and are the same as the widths X10, X8 and X6 of the OD ring. The widths X30, X28, and X26 can be, for example, approximately equal to five to ten percent of the width of the ramp section leading up to the ring (e.g. the width of the ridge between locations 254 and 256 can be equal to or approximately equal to five to ten percent of the width of ramp section 280 between locations 284 and 258).

Continuing with reference to FIG. 7, to provide added tolerance to receive corresponding teeth of the OD ring when the joint is press fit together, at the location of each tooth, an annular flat or cylindrical surface or ridge or peak ring having the same radius as the base of the tooth can be positioned at the leading edge of each tooth. These peak rings can have outwardly facing surfaces that extend between locations 254 and 258, of radius R18, for transition region 250, between locations 264 and 268, of radius R16, for transition region 260, and between locations 274 and 278, of radius R14, for transition region 170. The width (in the longitudinal direction of each of these troughs) is indicated as X31 for transition region 250, as X29 for transition region 260, and as X27 for transition region 270. These widths X31, X29 and X27, need not be the same, but in one desirable example they are the same and are also the same as the widths X7, X9 and X11 of the OD ring. The widths X26, X28 and X30 in one example are greater than the widths X27, X29 and X31. For example, the widths X26, X28 and X30 can be approximately ten to twenty percent greater than the widths X27, X29 and X30. For example the width of the trough between locations 254 and 256 can be approximately ten to twenty percent greater than the width of the ridge between locations 254 and 258.

The ID ring 120, as shown in FIG. 7 has an entrance section 286 adjacent the opening leading to the pipe that can have an inwardly facing cylindrical surface of a radius R18 that is less than or equal to the radius of the adjoining ramp section 280 to facilitate receipt of the ID ring by the OD ring as the pipe section containing the OD ring is advanced in the drive direction 222 of FIG. 6. This section is shown extending axially from a location 284 to a location 285. An annular chamfer 288 can be provided adjacent to distal end 109 to further guide the OD ring as the pipe sections are press fit together. The ID ring 120 also has a base section 318 adjacent the shelf 125 extending from the base 316 of the shelf to a location 314 at the end of ramp section 310. The base section 318 is desirably longer in the axial direction than the entrance section 286 [e.g. X25 is desirably greater than X32 in FIG. 7] to provide clearance to allow the teeth of the OD ring and ID ring (described below) to pass over one another and to be spaced apart from one another when the OD and ID rings are joined together. The illustrated base section can comprise a cylindrical surface of radius R2.

Exemplary ramp sections 280, 290, 300 and 310 of ID ring 120 are shown in FIG. 7. Ramp section 280 extends from location 284 to location 258, ramp section 290 extends from location 256 to location 268, ramp section 300 extends form location 266 to location 278, and ramp section 310 extends from location 276 to location 314. The ramp sections shown in FIG. 7 are annular and desirably extend continuously about the outer surface of the ID ring. Each of these ramps have a radius at its start location (respective start locations are 284, 256, 266 and 276) nearest to the distal end 123 that is less than the radius at the end of the ramp section furthest from the distal end (respective end locations 258, 268, 278 and 314). Desirably, these ramps have radii that progressively increase moving in the distal end toward shelf end direction. These ramps can be frustoconical in shape.

The slopes of the ramps S6, S7, S8 and S9 for the respective ramp sections 280, 290, 300 and 310 can be the same. However, more desirably, the slope of the first ramp section S6 is less than the slope of the other ramp sections. Also, the slope S9 of the last ramp section can be greater than the other slopes. In addition, the slopes S6 and S7 can be the same. The reduced slope S6 facilitates insertion of the ID Pipe further into the OD pipe before the ramp surfaces contact one another and thereby reduces the force required to push pipe ends together.

Although variable, desirably, each of the slopes S6, S7, S8 and S9 are less than 0.1. More desirably, the slopes S7, S8 and S9 can be from 0.05 to 0.08 and the slope S6 can be from 0.01 to 0.04 and desirably the slope S6 is less than the slope S4. As a specific example, the slope S6 can be approximately twenty percent less than the slope S4. The slopes S7 and S8 can be the same or approximately the same, and less than the slope S9. The slopes S7 and S8 can also be the same or approximately the same as the slopes S2 and S3.

The depth of the teeth in the OD ring 100 and ID ring 120 can vary with pipe diameter. One desirable example of tooth depths is 0.030 inch for pipe diameters up to 36 inches (e.g. for pipe diameters from 24 inches to 36 inches); 0.035 inch for pipe diameters from over 36 inches to 60 inches; and 0.040 inch for pipe diameters over 60 inches (e.g. from over 60 inches to 84 inches). These dimensions can vary, such as within a range of plus or minus 10 percent of these dimensions, which makes the dimensions approximately equal to the recited values.

The term approximately equal when used in this description and the claims is defined to mean a specified value plus or minus 10 percent of the specified value. A value will also be deemed to be equal to a specified value if it is within machining tolerances of plus or minus 0.005 percent. Alternatively, the depth of teeth can be varied with pipe diameter using the following formula: Tooth or transition depth= [[(pipe diameter/24)*0.005]+0.025], wherein * indicates multiplication and the pipe diameter is in inches. The tooth or transition depth can be approximately equal to the depth determined by this formula, meaning the value determined by the formula plus or minus 10% percent of the determined value.

Figure 8:
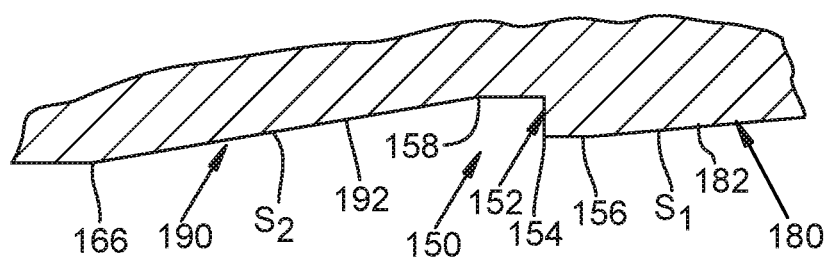
FIG. 8 is a sectional view through a portion of an OD ring, not to scale, and with interfitting features thereon shown exaggerated.
Figure 9:
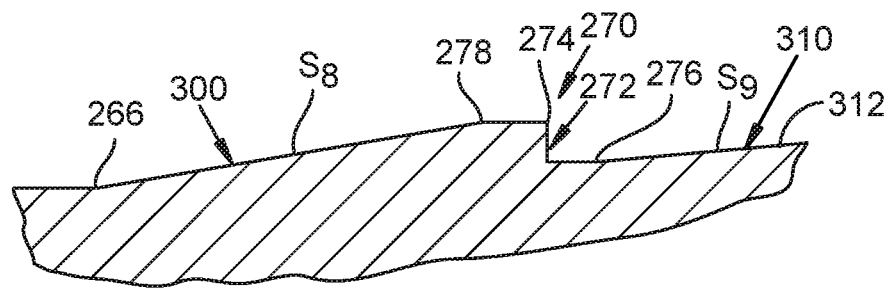
FIG. 9 is a sectional view through a portion of an ID ring, not to scale and with interfitting features of the ID pipe section shown exaggerated.

FIG. 8 shows a cross section of a portion of OD ring 100 with exaggerated features labeled with numbers used in FIG. 6 to assist in understanding the description. FIG. 8 shows a cross section of a portion of ID ring 120 with exaggerated features labeled with numbers used in FIG. 7 to further assist in understanding the description.

Figure 10:
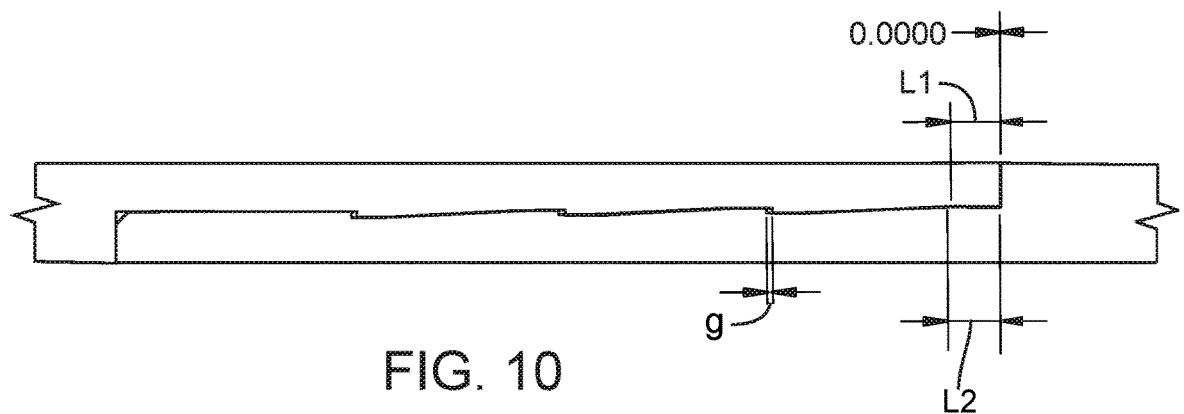
FIG. 10 illustrates the OD ring and ID ring when fully driven together.
Figure 11:
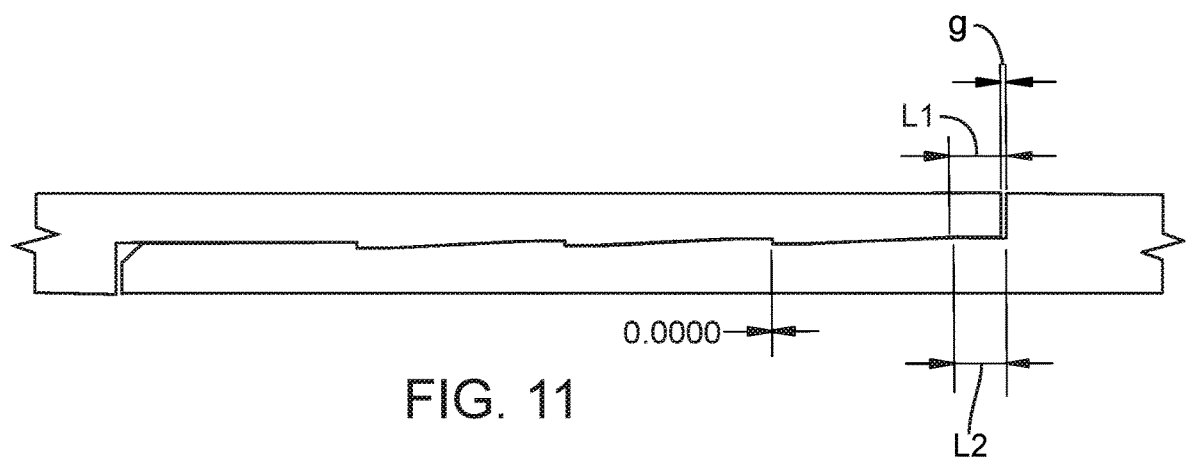
FIG. 11 illustrates the OD ring and ID ring with sloping features and interfitting ridges thereof positioned where the interfitting ridges first clear one another and prior to being driven to the position of FIG. 10.
Figure 12:
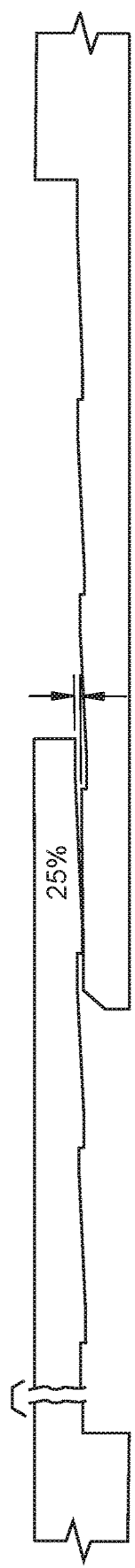
FIGS. 12-15 illustrate the progressive advancement of the OD ring on the ID ring as the rings are joined together; these FIGS. showing various installation positions from 25% installed through 100% installed, it being understood that the 100% installed position is like the position shown in FIG. 11 which is immediately prior to the final position shown in FIG. 10.
Figure 13:
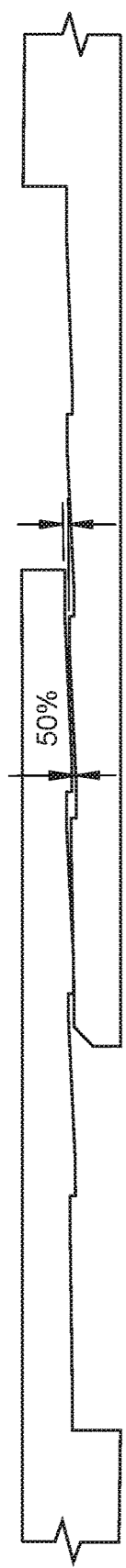
Figure 14:
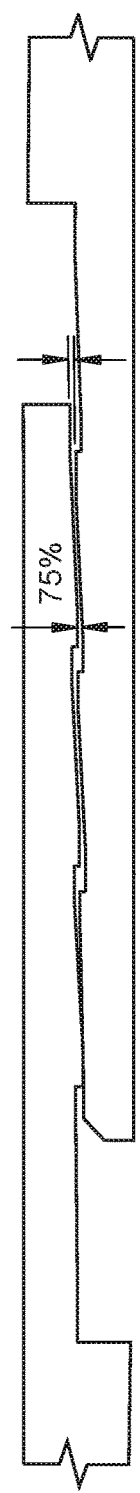
Figure 15:
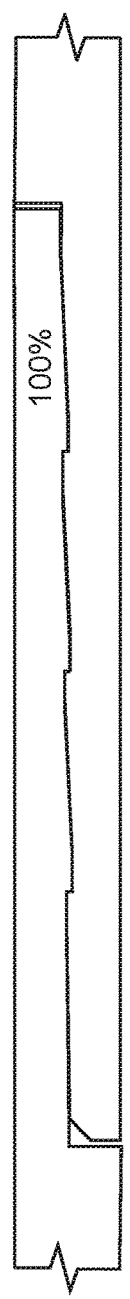

FIG. 10 illustrates some of the clearances when the pipe rings are fully installed with the respective distal end of each pipe section in engagement with the respective shelf of the other pipe section. In this position, this example shows that there is an approximately gap between the walls of adjacent teeth when installed. FIG. 11 is like FIG. 10, except the teeth are shown in position with the walls of adjacent teeth abutting one another.

FIGS. 12-15 illustrate the OD ring advancing over and receiving the ID ring in various stages of installation (25%, 50%, 75% and 100%, the latter position corresponding the FIG. 11 position).

The clearances are desirably such that the first ramp section 280 of the ID ring 120 can pass the first ramp section 180 of the OD ring without engaging the first ramp section 180 (assuming the longitudinal axes of the pipe sections are aligned). As a result, the OD pipe ring can be installed further over the ID pipe ring with reduced resistance. This also assists in guiding the two pipe rings together as the ID ring is positioned further into the OD ring before binding which assists in aligning the pipe sections.

In one test, the force required to connect pipe sections with the respective OD and ID rings of this disclosure was about one-half the force required to connect pipe sections shown in U.S. Pat. No. 5,921,591 to Argent. Therefore, the pipe joint of this disclosure is more suitable to auger boring operations wherein lower axial forces are typically available from an auger boring machine to press fit pipe sections together.

In view of the above description and for purposes of explanation and with further reference to FIGS. 5-7, an exemplary pipe joint is illustrated for joining first and second pipes 108,122, together. The illustrated pipe joint comprises an annular first or OD coupler 100 has a first longitudinal axis 136. The first coupler 100 is mounted to or formed in a first end 106 of the first pipe 108. In addition, the pipe joint comprises an annular second or ID coupler 120 having a second longitudinal axis 136. The second coupler 120 is formed in or mounted to a second end 130 of the second pipe 122.

The first coupler 100 of this embodiment comprises a first distal end 109, an annular first outer wall and an annular first inner wall. The first inner wall comprises a first set of interfitting features 140. The first distal end 109 defines a first pipe or first pipe coupler receiving opening into which the ID coupler 120 is inserted. In addition, the second coupler comprises a second distal end 123, an annular second outer wall and an annular second inner wall. The second outer wall comprising a second set of interfitting features 142. The second distal end and second coupler being sized for insertion into the first pipe receiving opening and into the first coupler to join the first and second pipes together, the second distal end defining a second pipe opening. That is, the first set of interfitting features 140 surround and interfit with the second set of interfitting features 142 to join the first and second pipes together (See FIG. 5).

The first set of interfitting features of the OD coupler 100 can comprise a first coupler first transition region 150 spaced from the first distal end 109, a first coupler second transition region 170 spaced further from (axially further from) the first distal end 109 than the first coupler first transition region 150, and at least one intermediate first coupler transition region (in FIG. 6 there is only one such first coupler intermediate coupler transition region 162, but there can be more, such as two or more than two first coupler intermediate transition regions) between the first coupler first transition region 150 and the first coupler second transition region 170. In FIG. 6, each of the first coupler first transition region 150, first coupler second transition region 170 and at least one first coupler transition region 160 are coaxial with the first longitudinal axis 136. As shown in FIG.

6, a first shelf 127 is shown positioned further (in the axial direction) from the first distal end 109 than the first coupler second transition region 170. The illustrated first shelf 127, has a first shelf surface that faces the first pipe receiving opening at the distal end 109 of the OD coupler 100. In addition, the first coupler first transition region comprises a first coupler first tooth or ridge 152 having a first coupler first tooth surface defined at a location 154 in the first coupler first transition region 150 where the first coupler first transition region has an increased radius from the first longitudinal axis 136. The first coupler first tooth surface faces the first shelf surface of the first shelf 127. In addition, the first coupler second transition region 170 comprises a first coupler second tooth or ridge having a first coupler second tooth surface defined at a location 174 in the first coupler second transition region 170 where the first coupler second transition region has an increased radius from the first longitudinal axis 136. The first coupler second tooth surface also faces the first shelf surface of the first shelf 127. In addition, each of the at least one first coupler intermediate transition region (region 160 in the FIG. 6 example) comprises a first coupler intermediate tooth or ridge 162 in FIG. 6 having a first coupler intermediate tooth surface defined at a location 164 in the first coupler intermediate transition region 160 where the first coupler intermediate transition region has an increased radius from the first longitudinal axis 136 and wherein the first coupler intermediate tooth surface faces the first shelf surface of the first shelf 127.

In addition, in this embodiment of FIGS. 5-7, the first set of interfitting features 140 further comprise a first coupler first ramp 180 with a first coupler first ramp surface 182 between the first distal end and the first coupler first transition region 152, a first coupler second ramp 210 with a first coupler second ramp surface 212 between the first coupler first transition region 150 and the first shelf, and first coupler intermediate ramps (190 and 200 in FIG. 6), each first coupler intermediate ramp having a respective first coupler intermediate ramp surface (surface 192 for ramp 190 and surface 202 for ramp 200 in FIG. 6), the first coupler intermediate ramps being positioned at opposite sides of each of the at least one first coupler intermediate transition region (in FIG. 6, there is one first coupler intermediate transition region at 160, ramps 190, 200 are at opposite sides (in the axial direction) from the transition region 160); and wherein the first coupler first ramp surface 180 has a first coupler first ramp surface slope S1 moving in a direction away from the first shelf 127, the first coupler second ramp surface 210 has a first coupler second ramp surface slope S4 moving in a direction away from the first shelf 127, and wherein the first coupler intermediate ramp surfaces 190, 200 each have a respective first coupler intermediate ramp surface slope (S2 for ramp 190 and S3 for ramp 200 in FIG. 6) moving in a direction away from the first shelf 127.

Also, in the FIGS. 5-7 embodiments, the second set of interfitting features 142 comprise a second coupler first transition region 250 spaced from the second distal end 123, a second coupler second transition region 270 spaced from the second distal end 123 and positioned further from the second distal end 123 than the second coupler first transition region 250, and at least one intermediate second coupler transition region between the second coupler first transition region and the second coupler second transition region (in FIG. 7 there is only one such second coupler intermediate coupler transition region 260, but there can be more intermediate transition regions, such as two or more than two second coupler intermediate transition regions). In the FIG. 7 embodiment, each of the second coupler first transition region 250, second coupler second transition region 270 and at least one second coupler transition region (260 in FIG. 7) are coaxial with the second longitudinal axis 136 (the second longitudinal axis is the same as the first longitudinal axis when the pipe sections are joined).

With further reference to the embodiment of FIG. 7, a second shelf 125 is positioned further from the second distal end 123 than the second coupler second transition region 270. The shelf 125 has a second shelf surface that faces the second pipe opening defined at the distal end 123. In addition, in this embodiment, the second coupler first transition region 250 comprises a second coupler first tooth or ridge 252 having a second coupler first tooth surface defined at a location 254 in the second coupler first transition region 250 where the second coupler first transition region 250 has a decreased radius from the second longitudinal axis 136 and wherein the second coupler first tooth surface faces the second shelf surface of the shelf 125. Also, the second coupler second transition region 270 comprises a second coupler second tooth or ridge 272 having a second coupler second tooth surface defined at a location 274 in the second coupler second transition region 270 where the second coupler second transition region has a decreased radius from the second longitudinal axis 236, and wherein the second coupler second tooth surface faces the second shelf surface, In addition, each of the at least one second coupler intermediate transition region (region 260 in FIG. 7) comprises a second coupler intermediate tooth (tooth or ridge 262 in FIG. 7) having a second coupler intermediate tooth surface defined at a location (264 in FIG. 7) in the second coupler intermediate transition region 260 where the second coupler intermediate transition region 260 has a decreased radius from the second longitudinal axis 236, and wherein the second coupler intermediate tooth surface faces the second shelf surface of the second shelf 125.

With further reference to FIG. 7, the second set of interfitting features 142 further comprises a second coupler first ramp 280 with a second coupler first ramp surface 282 between the second distal end 123 and the second coupler first transition region 250, a second coupler second ramp 310 with a second coupler second ramp surface 312 between the second coupler first transition region 250 and the second shelf 125, and second coupler intermediate ramps (290 and 300 in FIG. 7), each second coupler intermediate ramp having a respective second coupler intermediate ramp surface (the surface of ramp 290 and the surface of ramp 300 in FIG. 7), the second coupler intermediate ramps being positioned at opposite sides of each of the at least one second coupler intermediate transition region (in FIG. 7, there is one second coupler intermediate transition region at 260; ramps 290, 300 are at opposite sides (in the axial direction) from the transition region 260); and wherein the second coupler first ramp surface 282 has a second coupler first ramp surface slope S6 moving in a direction away from the second distal end 123, the second coupler second ramp surface 312 has a second coupler second ramp surface slope S9 moving in a direction away from the second distal end 123, and wherein the second coupler intermediate ramp surfaces (surfaces of ramps 290 and 300 in FIG. 7) each have a second coupler intermediate ramp surface slope (S7 for ramp 290 and S8 for ramp 300 in FIG. 7) moving in a direction away from the second distal end.

In addition, in the embodiment of FIGS. 5-7, wherein the first coupler first ramp surface slope, the first coupler second ramp surface slope, the first coupler intermediate ramp surface slope, the second coupler first ramp surface slope, the second coupler second ramp surface slope, and the second coupler intermediate ramp surface slope are desirably each positive and less than 0.1.

Desirably, the surfaces defining the interfitting features are annular. In addition, desirably the ramp surfaces are frustoconical and coaxial with the longitudinal axes. In addition, the teeth or ridges are also desirably coaxial with the longitudinal axes. In addition, portions of the transition regions on opposite sides of the teeth are desirably annular, and most desirably are cylindrical and coaxial with the longitudinal axes.

As another aspect of embodiments, the first coupler first ramp surface slope can be greater than the first coupler second ramp surface slope, and the second coupler first ramp surface slope can be less than the second coupler second ramp surface slope. For example, the first coupler second ramp surface slope can be approximately one-third the first coupler first ramp surface slope.

As an additional aspect of embodiments, the second coupler second ramp surface slope can be less than the first coupler first ramp surface slope. For example, the second coupler second ramp surface slope can be approximately twenty percent less than the first coupler first ramp surface slope.

As a more specific example, the first coupler first ramp surface slope and the first coupler intermediate ramp surface slope can be from 0.05 to 0.08, the first coupler second ramp surface slope can be from 0.01 to 0.04; the second coupler first ramp surface slope can be from 0.01 to 0.04 and the second coupler second ramp surface slope and the second coupler intermediate ramp surface slope can be from 0.05 to 0.08.

As yet another aspect of embodiments, the second coupler intermediate ramp surface slope can be the same or approximately the same for each second coupler intermediate ramp and less than the second coupler second ramp surface slope, and wherein the second coupler second ramp surface slope and second coupler intermediate ramp slope can be greater than the second coupler first ramp surface slopes.

As still further aspects of embodiments, the first coupler intermediate ramp surface slope can be the same or approximately the same for each first coupler intermediate ramp and greater than the first coupler first ramp surface slope and greater than the first coupler second ramp surface slope, and wherein the first coupler first ramp surface slope can be less than the first coupler second ramp surface slope.

As yet another aspect of embodiments, the tooth depth of each tooth or ridge can be equal to the height of the tooth surface in the radial direction and can range from approximately 0.03 to 0.04 inches.

As a further aspect of embodiments, the tooth depth of each tooth can be equal to the height of the tooth surface in the radial direction and can be determined by the formula: Tooth or transition depth is equal to or approximately equal to: [[(pipe diameter/24)*0.005]+0.025], wherein * indicates multiplication and the pipe diameter is in inches.

As another aspect of embodiments, a respective first coupler first annular surface of a constant diameter and coaxial with the first longitudinal axis is positioned at the side of each tooth of the first coupler nearest to the first distal end and a respective first coupler second annular surface of a constant diameter and coaxial with the first longitudinal axis is positioned at the side of each tooth of the first coupler nearest to the first shelf; wherein a respective second coupler first annular surface of a constant diameter and coaxial with the second longitudinal axis is positioned at the side of each tooth of the second coupler nearest to the second distal end and a respective second coupler second annular surface of a constant diameter and coaxial with the second longitudinal axis is positioned at the side of each tooth of the second coupler nearest to the second shelf, wherein the widths of the first coupler first annular surfaces in the longitudinal direction are less than the widths of the first coupler second annular surfaces in the longitudinal direction; and wherein the widths of the second coupler first annular surfaces in the longitudinal direction are less than the widths of the second coupler second annular surfaces in the longitudinal direction.

As a further aspect of embodiments, each of the first coupler first ramp sections, first coupler second ramp section, first coupler intermediate ramp sections, second coupler first ramp section, second coupler second ramp section, and second coupler intermediate ramp sections each have the same length in the longitudinal direction and wherein the first coupler first annular surfaces and second coupler first annular surfaces have a length in the longitudinal direction that is approximately five to ten present of the length of the ramp sections.

As another aspect of embodiments, the first coupler desirably comprises a first coupler base section extending from the first shelf to the first coupler second ramp section and has a first coupler base section axial length, the first coupler also comprising a first coupler entrance section extending from the first distal end to the first coupler first ramp section and having a first coupler entrance section axial length, the first coupler base section having an axial length that is longer than the axial length of the first coupler entrance section. In addition, the second coupler desirably comprises a second coupler base section extending from the second shelf to the second coupler second ramp section and has a second coupler base section axial length, the second coupler also comprising a second coupler entrance section extending from the second distal end to the second coupler first ramp section and having a second coupler entrance section axial length, the second coupler base section having an axial length that is longer than the axial length of the second coupler entrance section. In addition, the first coupler base section axial length can be the same as the second coupler base section axial length and the first coupler entrance section axial length can be the same as the second coupler entrance section axial length.

In accordance with an additional aspect, the diameter of the second coupler at the location of the second coupler first tooth at the second coupler first transition region is less than or equal to the diameter of the first coupler first tooth at the location of the first coupler first transition region. With this construction, when axially aligned, the second coupler can be inserted deeply into the first coupler and beyond the first coupler first tooth with a reduced insertion force. This also allows the joints to be coupled together while axially aligned and without the need, or while minimizing any need, to tilt the pipe being inserted.

As a further aspect in combination with one or more of the above aspects, the first and second pipes have respective first and second ends, and the first coupler can comprise a first ring adapted to be mounted to a first end of the first pipe and the second coupler can comprise a second ring adapted to be mounted to the second end of the second pipe. Alternatively, the features of the first and second couplers can be formed in the ends of lengths of pipe. For example, a first coupler can be formed in or mounted to the first end of a first pipe and a second coupler can being formed in or mounted to the second end of the first pipe. A plurality of such pipes can then be joined together by their respective first and second couplers.

In view of the many possible embodiments to which the principles of the disclosed invention may be applied, it should be recognized that the illustrated embodiments are only desirable examples of the invention and should not be taken as limiting the scope of the invention. The claims below set forth the claimed invention.

I claim:

1. A pipe joint comprising:
a first coupler with an inner wall surface and a first set of interfitting first coupler features on the inner wall surface, the first coupler comprising a first distal end defining a coupler receiving opening;
a second coupler with an outer wall surface and a second set of interfitting second coupler features on the outer wall surface, the second coupler comprising a second distal end, the first and second coupler features being sized and positioned to engage one another to join the first and second couplers together when the second coupler is inserted into the coupler receiving opening of the first coupler;
the first coupler features comprising a first coupler first tooth spaced from the first distal end and positioned in a first coupler first transition region, a first coupler second tooth positioned in a first coupler second transition region, and a first coupler intermediate tooth spaced from the first distal end and positioned in a first coupler intermediate transition region positioned between the first coupler first and second transition regions, the first coupler second transition region being positioned further from the first distal end than the first coupler first transition region;
the second coupler features comprising a second coupler first tooth spaced from the second distal end and positioned in a second coupler first transition region, a second coupler second tooth positioned in a second coupler second transition region, and a second coupler intermediate tooth spaced from the second distal end and positioned in a second coupler intermediate transition region positioned between the second coupler first and second transition regions, the second coupler second transition region being positioned further from the second distal end than the second coupler first transition region;
the first coupler features comprising a first coupler first ramp between the first coupler first tooth and the first distal end, a first coupler second ramp positioned further from the first distal end than the first coupler second tooth, and first coupler first and second intermediate ramps on opposite sides of first coupler intermediate tooth;
the second coupler features comprising a second coupler first ramp between the seconds coupler first tooth and the second distal end, a second coupler second ramp positioned further from the second distal end than the second coupler second tooth, and second coupler first and second intermediate ramps on opposite sides of second coupler intermediate tooth; and
wherein the first coupler first ramp has a first coupler first ramp surface with a first coupler first ramp surface slope and the first coupler second ramp has a first coupler second ramp surface with a first coupler second ramp slope, and wherein the first coupler first ramp surface slope is greater than the first coupler second ramp surface slope.

2. An apparatus according to claim 1 wherein the second coupler first ramp has a second coupler first ramp surface with a second coupler first ramp surface slope and the second coupler second ramp has a second coupler second ramp surface with a second coupler second ramp slope, and wherein the second coupler first ramp surface slope is less than the second coupler second ramp surface slope.

3. An apparatus according to claim 2 wherein the second coupler second ramp surface slope is less than the first coupler first ramp surface slope.

4. An apparatus according to claim 1 wherein the first coupler first intermediate ramp has a first coupler first intermediate ramp surface with a first coupler intermediate ramp surface slope, the first coupler second intermediate ramp has a first coupler second intermediate ramp surface with a first coupler second intermediate ramp surface slope, the second coupler first intermediate ramp has a second coupler first intermediate ramp surface with a second coupler first intermediate ramp surface slope, and the second coupler second intermediate ramp has a second coupler second intermediate ramp surface with a second coupler second intermediate ramp surface slope; and wherein each of the ramp surface slopes is less than 0.1.

5. An apparatus according to claim 4 wherein the first coupler first ramp surface slope and the first coupler intermediate ramp surface slopes are between 0.05 and 0.08, the first coupler second ramp surface slope is from 0.01 to 0.04; the second coupler first ramp surface slope is from 0.01 to 0.04 and the second coupler second ramp surface slope and the second coupler intermediate ramp surface slopes are from 0.05 to 0.08.

6. An apparatus according to claim 4 wherein the second coupler first intermediate ramp surface slope and the second coupler second ramp surface slope are the same or approximately the same and are less than the second coupler second ramp surface slope; and wherein the second coupler second ramp surface slope, the second coupler first intermediate ramp surface slope and the second coupler second intermediate ramp surface slope are each greater than the than the second coupler first ramp surface slope.

7. An apparatus according to claim 6 wherein the first coupler first intermediate ramp surface slope and the first coupler second intermediate slope are the same or approximately the same, and wherein the first coupler first intermediate ramp surface slope and the first coupler second intermediate slope are each greater than the first coupler first ramp surface slope and greater than the first coupler second ramp surface slope, and wherein the first coupler second ramp surface slope is less than the first coupler second ramp surface slope.

8. An apparatus according to claim 1 wherein each of the first and second couplers has a respective longitudinal axis, and wherein the tooth depth of each tooth is equal to the height of the tooth surface in the radial direction from the longitudinal axis and each tooth depth is within the range of from approximately 0.03 to 0.04 inches.

9. An apparatus according to claim 1 wherein each of the first and second couplers has a respective longitudinal axis, and wherein the tooth depth of each tooth is equal to the height of the tooth surface in the radial direction from the longitudinal axis, and wherein the tooth depth is determined by the formula: Tooth or transition depth is equal to or approximately equal to: [[(pipe diameter/24)*0.005]+0.025], wherein * indicates multiplication and the pipe diameter is in inches.

10. An apparatus according to claim 1 wherein the first coupler comprises a first longitudinal axis and wherein the first coupler features comprise a respective first coupler first annular surface of a constant diameter and coaxial with the first longitudinal axis positioned at the side of each tooth of the first coupler nearest to the first distal end and a respective first coupler second annular surface of a constant diameter and coaxial with the first longitudinal axis is positioned at the side of each tooth of the first coupler furthest from the distal end; wherein the second coupler comprises a second longitudinal axis and wherein the second coupler features comprise a respective second coupler first annular surface of a constant diameter and coaxial with the second longitudinal axis positioned at the side of each tooth of the second coupler nearest to the second distal end and a respective second coupler second annular surface of a constant diameter and coaxial with the second longitudinal axis positioned at the side of each tooth of the second coupler furthest from the second distal end; wherein the widths of the first coupler first annular surfaces in the direction of the first longitudinal axis are less than the widths of the first coupler second annular surfaces in the direction of the first longitudinal axis; and wherein the widths of the second coupler first annular surfaces in the direction of the second longitudinal axis are less than the widths of the second coupler second annular surfaces in the direction of the second longitudinal axis.

11. An apparatus according to claim 1 wherein each of the first coupler first ramp, first coupler second ramp, first coupler first and second intermediate ramps, second coupler first ramp, second coupler second ramp, and second coupler first and second intermediate ramp each have the same length in the longitudinal direction and wherein the first coupler first annular surfaces and second coupler first annular surfaces have a length in the longitudinal direction that is approximately five to ten present percent of the length of the ramp sections.

12. An apparatus according to claim 1 wherein the first coupler features comprise a first shelf spaced further from the first distal end than the first coupler second transition region, the first coupler features also comprising a first coupler base section extending from the first shelf to the first coupler second ramp section and having a first coupler base section axial length, the first coupler also comprising a first coupler entrance section extending from the first distal end to the first coupler first ramp section and having a first coupler entrance section axial length, wherein the first coupler base section axial length that is longer than the first coupler entrance section axial length; and wherein the second coupler features comprise a second shelf spaced further from the second distal end than the second coupler second transition region, the second coupler features also comprising a second coupler base section extending from the second shelf to the second coupler second ramp section and having a second coupler base section axial length, the second coupler also comprising a second coupler entrance section extending from the second distal end to the second coupler first ramp section and having a second coupler entrance section axial length, wherein the second coupler base section axial length is longer than the second coupler entrance section axial length.

13. An apparatus according to claim 12 wherein the first coupler base section axial length is the same as the second coupler base section axial length and the first coupler entrance section axial length is the same as the second coupler entrance section axial length.

14. An apparatus according to claim 1 wherein the diameter of the second coupler at the location of the second coupler first tooth at the second coupler first transition region is less than or equal to the diameter of the first coupler first tooth at the location of the first coupler first transition region.

15. A pipe joint comprising:
a first coupler with an inner wall surface and a first set of interfitting first coupler features on the inner wall surface, the first coupler comprising a first distal end defining a coupler receiving opening;
a second coupler with an outer wall surface and a second set of interfitting second coupler features on the outer wall surface, the second coupler comprising a second distal end, the first and second coupler features being sized and positioned to engage one another to join the first and second couplers together when the second coupler is inserted into the coupler receiving opening of the first coupler;
the first coupler features comprising a first coupler first tooth spaced from the first distal end and positioned in a first coupler first transition region, a first coupler second tooth positioned in a first coupler second transition region, and a first coupler intermediate tooth spaced from the first distal end and positioned in a first coupler intermediate transition region positioned between the first coupler first and second transition regions, the first coupler second transition region being positioned further from the first distal end than the first coupler first transition region;
the second coupler features comprising a second coupler first tooth spaced from the second distal end and positioned in a second coupler first transition region, a second coupler second tooth positioned in a second coupler second transition region, and a second coupler intermediate tooth spaced from the second distal end and positioned in a second coupler intermediate transition region positioned between the second coupler first and second transition regions, the second coupler second transition region being positioned further from the second distal end than the second coupler first transition region;
the first coupler features comprising a first coupler first ramp between the first coupler first tooth and the first distal end, a first coupler second ramp positioned further from the first distal end than the first coupler second tooth, and first coupler first and second intermediate ramps on opposite sides of first coupler intermediate tooth;
the second coupler features comprising a second coupler first ramp between the seconds coupler first tooth and the second distal end, a second coupler second ramp positioned further from the second distal end than the second coupler second tooth, and second coupler first and second intermediate ramps on opposite sides of second coupler intermediate tooth; and
wherein the first coupler first ramp has a first coupler first ramp surface with a first coupler first ramp surface slope and the first coupler second ramp has a first coupler second ramp surface with a first coupler second ramp slope, and wherein the first coupler first ramp surface slope is greater than the first coupler second ramp surface slope;
wherein the second coupler first ramp has a second coupler first ramp surface with a second coupler first ramp surface slope and the second coupler second ramp has a second coupler second ramp surface with a second coupler second ramp slope, and wherein the second coupler first ramp surface slope is less than the second coupler second ramp surface slope;
wherein the second coupler second ramp surface slope is less than the first coupler first ramp surface slope;
wherein the first coupler first intermediate ramp has a first coupler first intermediate ramp surface with a first coupler intermediate ramp surface slope, the first coupler second intermediate ramp has a first coupler second intermediate ramp surface with a first coupler second intermediate ramp surface slope, the second coupler first intermediate ramp has a second coupler first intermediate ramp surface with a second coupler first intermediate ramp surface slope, and the second coupler second intermediate ramp has a second coupler second intermediate ramp surface with a second coupler second intermediate ramp surface slope; and wherein each of the ramp surface slopes is less than 0.1;

wherein the second coupler first intermediate ramp surface slope and the second coupler second ramp surface slope are the same or approximately the same and are less than the second coupler second ramp surface slope; and wherein the second coupler second ramp surface slope, the second coupler first intermediate ramp surface slope and the second coupler second intermediate ramp surface slope are each greater than the than the second coupler first ramp surface slope;

wherein the first coupler first intermediate ramp surface slope and the first coupler second intermediate slope are the same or approximately the same, and wherein the first coupler first intermediate ramp surface slope and the first coupler second intermediate slope are each greater than the first coupler first ramp surface slope and greater than the first coupler second ramp surface slope, and wherein the first coupler second ramp surface slope is less than the first coupler second ramp surface slope;

wherein each of the first and second couplers has a respective longitudinal axis, and wherein the tooth depth of each tooth is equal to the height of the tooth surface in the radial direction from the longitudinal axis and each tooth depth is within the range of from approximately 0.03 to 0.04 inches;

wherein the first coupler comprises a first longitudinal axis and wherein the first coupler features comprise a respective first coupler first annular surface of a constant diameter and coaxial with the first longitudinal axis positioned at the side of each tooth of the first coupler nearest to the first distal end and a respective first coupler second annular surface of a constant diameter and coaxial with the first longitudinal axis is positioned at the side of each tooth of the first coupler furthest from the distal end; wherein the second coupler comprises a second longitudinal axis and wherein the second coupler features comprise a respective second coupler first annular surface of a constant diameter and coaxial with the second longitudinal axis positioned at the side of each tooth of the second coupler nearest to the second distal end and a respective second coupler second annular surface of a constant diameter and coaxial with the second longitudinal axis positioned at the side of each tooth of the second coupler furthest from the second distal end; wherein the widths of the first coupler first annular surfaces in the direction of the first longitudinal axis are less than the widths of the first coupler second annular surfaces in the direction of the first longitudinal axis; and wherein the widths of the second coupler first annular surfaces in the direction of the second longitudinal axis are less than the widths of the second coupler second annular surfaces in the direction of the second longitudinal axis;

wherein the first coupler features comprise a first shelf spaced further from the first distal end than the first coupler second transition region, the first coupler features also comprising a first coupler base section extending from the first shelf to the first coupler second ramp section and having a first coupler base section axial length, the first coupler also comprising a first coupler entrance section extending from the first distal end to the first coupler first ramp section and having a first coupler entrance section axial length, wherein the first coupler base section axial length that is longer than the first coupler entrance section axial length; and wherein the second coupler features comprise a second shelf spaced further from the second distal end than the second coupler second transition region, the second coupler features also comprising a second coupler base section extending from the second shelf to the second coupler second ramp section and having a second coupler base section axial length, the second coupler also comprising a second coupler entrance section extending from the second distal end to the second coupler first ramp section and having a second coupler entrance section axial length, wherein the second coupler base section axial length is longer than the second coupler entrance section axial length; and wherein the diameter of the second coupler at the location of the second coupler first tooth at the second coupler first transition region is less than or equal to the diameter of the first coupler first tooth at the location of the first coupler first transition region.

16. A pipe joint for joining first and second pipes together, the pipe joint comprising:

an annular first coupler having a first longitudinal axis, the first coupler being mounted to or formed in a first end of the first pipe, and an annular second coupler having a second longitudinal axis, the second coupler being formed in or mounted to a second end of the second pipe;

the first coupler comprising a first distal end, an annular first outer wall and an annular first inner wall, the first distal end defining a first pipe receiving opening;

the second coupler comprising a second distal end, an annular second outer wall and an annular second inner wall, the second distal end and second coupler being sized for insertion into the first pipe receiving opening and into the first coupler to join the first and second pipes together, the second distal end defining a second pipe opening;

the first inner wall comprising a first set of interfitting features and the second outer wall comprising a second set of interfitting features, the first set of interfitting features surrounding and interfitting with the second set of interfitting features to join the first and second pipes together;

the first set of interfitting features comprising a first coupler first transition region spaced from the first distal end, a first coupler second transition region spaced further from the first distal end than the first coupler first transition region, and at least one intermediate first coupler transition region between the first coupler first transition region and the first coupler second transition region; wherein each of the first coupler first transition region, first coupler second transition region and at least one intermediate first coupler transition region are coaxial with the first longitudinal axis; a first shelf positioned further from the first distal end than the first coupler second transition region and having a first shelf surface that faces the first pipe receiving opening; wherein the first coupler first transition region comprises a first coupler first tooth having a first coupler first tooth surface defined at a location in the first coupler first transition region where the first coupler first transition region has an increased radius from the first longitudinal axis and wherein the first coupler first tooth surface faces the first shelf surface; wherein the first coupler second transition region comprises a first coupler second tooth having a first coupler second tooth surface defined at a location in the first coupler second transition region where the first coupler second transition region has an increased radius from the first longitudinal axis and wherein the first coupler second tooth surface faces the first shelf surface; and wherein each of the at least one first coupler intermediate transition region comprises a first coupler intermediate tooth having a first coupler intermediate tooth surface defined at a location in the first coupler intermediate transition region where the first coupler intermediate transition region has an increased radius from the first longitudinal axis and wherein the first coupler intermediate tooth surface faces the first shelf surface;

the first set of interfitting features further comprising a first coupler first ramp with a first coupler first ramp surface between the first distal end and the first coupler first transition region, a first coupler second ramp with a first coupler second ramp surface between the first coupler first transition region and the first shelf, and first coupler intermediate ramps, each first coupler intermediate ramp having a respective first coupler intermediate ramp surface, the first coupler intermediate ramps being positioned at opposite sides of each of the at least one first coupler intermediate transition region; and wherein the first coupler first ramp surface has a first coupler first ramp surface slope moving in a direction away from the first shelf, the first coupler second ramp surface has a first coupler second ramp surface slope moving in a direction away from the first shelf, and wherein the first coupler intermediate ramp surfaces each have a respective first coupler intermediate ramp surface slope moving in a direction away from the first shelf;

the second set of interfitting features comprising a second coupler first transition region spaced from the second distal end, a second coupler second transition region spaced from the second distal end and positioned further from the second distal end than the second coupler first transition region, and at least one intermediate second coupler transition region between the second coupler first transition region and the second coupler second transition region, each of the second coupler first transition region, second coupler second transition region and at least one intermediate second coupler transition region being coaxial with the second longitudinal axis; a second shelf positioned further from the second distal end than the second coupler second transition region and having a second shelf surface that faces the second pipe opening; wherein the second coupler first transition region comprises a second coupler first tooth having a second coupler first tooth surface defined at a location in the second coupler first transition region where the second coupler first transition region has a decreased radius from the second longitudinal axis and wherein the second coupler first tooth surface faces the second shelf surface; wherein the second coupler second transition region comprises a second coupler second tooth having a second coupler second tooth surface defined at a location in the second coupler second transition region where the second coupler second transition region has a decreased radius from the second longitudinal axis and wherein the second coupler second tooth surface faces the second shelf surface; and wherein each of the at least one second coupler intermediate transition region comprises a second coupler intermediate tooth having a second coupler intermediate tooth surface defined at a location in the second coupler intermediate transition region where the second coupler intermediate transition region has a decreased radius from the second longitudinal axis and wherein the second coupler intermediate tooth surface faces the second shelf surface;

the second set of interfitting features further comprising a second coupler first ramp with a second coupler first ramp surface between the second distal end and the second coupler first transition region, a second coupler second ramp with a second coupler second ramp surface between the second coupler first transition region and the second shelf, and second coupler intermediate ramps, each second coupler intermediate ramp having a respective second coupler intermediate ramp surface, the second coupler intermediate ramps being positioned at opposite sides of each of the at least one second coupler intermediate transition region; and wherein the second coupler first ramp surface has a second coupler first ramp surface slope moving in a direction away from the second distal end, the second coupler second ramp surface has a second coupler second ramp surface slope moving in a direction away from the second distal end, and wherein the second coupler intermediate ramp surfaces each have a second coupler intermediate ramp surface slope moving in a direction away from the second distal end;

wherein the first coupler first ramp surface slope, the first coupler second ramp surface slope, the first coupler intermediate ramp surface slope, the second coupler first ramp surface slope, the second coupler second ramp surface slope, and the second coupler intermediate ramp surface slope are each positive and less than 0.1; and wherein the second coupler second ramp surface slope is less than the first coupler first ramp surface slope.

17. An apparatus according to claim 16 wherein the first coupler first ramp surface slope is greater than the first coupler second ramp surface slope, and wherein the second coupler first ramp surface slope is less than the second coupler second ramp surface slope.

18. An apparatus according to claim 16 wherein the first coupler second ramp surface slope is approximately one-third the first coupler first ramp surface slope.

19. An apparatus according to claim 16 wherein the second coupler second ramp surface slope is approximately twenty percent less than the first coupler first ramp surface slope.

20. An apparatus according to claim 16 wherein the first coupler first ramp surface slope and the first coupler intermediate ramp surface slope are from 0.05 to 0.08 and wherein the first coupler second ramp surface slope is from 0.01 to 0.04; and wherein the second coupler first ramp surface slope is from 0.01 to 0.04 and the second coupler second ramp surface slope and the second coupler intermediate ramp surface slope are from 0.05 to 0.08.

21. An apparatus according to claim 16 wherein the second coupler intermediate ramp surface slope is the same or approximately the same for each second coupler intermediate ramp and less than the second coupler second ramp surface slope, and wherein the second coupler second ramp surface slope and second coupler intermediate ramp slope are greater than the second coupler first ramp surface slopes.

22. An apparatus according to claim 21 wherein the first coupler intermediate ramp surface slope is the same or approximately the same for each first coupler intermediate ramp and greater than the first coupler first ramp surface slope and greater than the first coupler second ramp surface slope, and wherein the first coupler second ramp surface slope is less than the first coupler second ramp surface slope.

23. An apparatus according to claim 16 wherein each of the first coupler first ramp, first coupler second ramp and first coupler intermediate ramps are frustoconical and coaxial with the first longitudinal axis; and wherein each of the second coupler first ramp, second coupler second ramp and second coupler intermediate ramps are frustoconical and coaxial with the second longitudinal axis.

24. An apparatus according to claim 16 wherein the tooth depth of each tooth is equal to the height of the tooth surface in the radial direction and ranges from approximately 0.03 to 0.04 inches.

25. An apparatus according to claim 16 wherein the tooth depth of each tooth is equal to the height of the tooth surface in the radial direction and is determined by the formula: Tooth or transition depth is equal to or approximately equal to: [[(pipe diameter/24)*0.005]+0.025], wherein * indicates multiplication and the pipe diameter is in inches.

26. An apparatus according to claim 16 wherein a respective first coupler first annular surface of a constant diameter and coaxial with the first longitudinal axis is positioned at the side of each tooth of the first coupler nearest to the first distal end and a respective first coupler second annular surface of a constant diameter and coaxial with the first longitudinal axis is positioned at the side of each tooth of the first coupler nearest to the first shelf, wherein a respective second coupler first annular surface of a constant diameter and coaxial with the second longitudinal axis is positioned at the side of each tooth of the second coupler nearest to the second distal end and a respective second coupler second annular surface of a constant diameter and coaxial with the second longitudinal axis is positioned at the side of each tooth of the second coupler nearest to the second shelf, wherein the widths of the first coupler first annular surfaces in the longitudinal direction are less than the widths of the first coupler second annular surfaces in the longitudinal direction; and wherein the widths of the second coupler first annular surfaces in the longitudinal direction are less than the widths of the second coupler second annular surfaces in the longitudinal direction.

27. An apparatus according to claim 26 wherein each of the first coupler first ramp sections, first coupler second ramp section, first coupler intermediate ramp sections, second coupler first ramp section, second coupler second ramp section, and second coupler intermediate ramp sections each have the same length in the longitudinal direction and wherein the first coupler first annular surfaces and second coupler first annular surfaces have a length in the longitudinal direction that is approximately five to ten percent of the length of the ramp sections.

28. An apparatus according to claim 16 wherein the first coupler comprises a first coupler base section extending from the first shelf to the first coupler second ramp section and having a first coupler base section axial length, the first coupler also comprising a first coupler entrance section extending from the first distal end to the first coupler first ramp section and having a first coupler entrance section axial length, the first coupler base section having an axial length that is longer than the axial length of the first coupler entrance section; and wherein the second coupler comprises a second coupler base section extending from the second shelf to the second coupler second ramp section and having a second coupler base section axial length, the second coupler also comprising a second coupler entrance section extending from the second distal end to the second coupler first ramp section and having a second coupler entrance section axial length, the second coupler base section having an axial length that is longer than the axial length of the second coupler entrance section.

29. An apparatus according to claim 28 wherein the first coupler base section axial length is the same as the second coupler base section axial length and the first coupler entrance section axial length is the same as the second coupler entrance section axial length.

30. An apparatus according to claim 16 wherein the diameter of the second coupler at the location of the second coupler first tooth at the second coupler first transition region is less than or equal to the diameter of the first coupler first tooth at the location of the first coupler first transition region.

31. An apparatus according to claim 16 wherein the first and second pipes have respective first and second ends, the first coupler comprises a first ring adapted to be mounted to a first end of the first pipe and the second coupler comprises a second ring adapted to be mounted to the second end of the second pipe.

32. A pipe ram joint according to claim 16 wherein the first and second pipes have respective first and second ends, a first of the first couplers being formed in or mounted to the first end of the first pipe and a second of the first couplers being formed in or mounted to the first end of the second pipe; and a first of the second couplers being formed in or mounted to the second end of the first pipe and a second of the second couplers being formed in or mounted to the second end of the second pipe.

* * * * *